United States Patent
Feldmann et al.

(10) Patent No.: US 12,455,488 B2
(45) Date of Patent: Oct. 28, 2025

(54) OPTICAL COUPLING DEVICE WITH ADJUSTABLE COUPLING COEFFICIENT

(71) Applicant: SALIENCE LABS LTD, Thame (GB)

(72) Inventors: Johannes Feldmann, Oxfordshire (GB); Vayshnavee Kewada, Oxfordshire (GB)

(73) Assignee: SALIENCE LABS LTD, Thame (GB)

( * ) Notice: Subject to any disclaimer, the term of this patent is extended or adjusted under 35 U.S.C. 154(b) by 0 days.

(21) Appl. No.: 18/402,660

(22) Filed: Jan. 2, 2024

(65) Prior Publication Data

US 2024/0248367 A1 Jul. 25, 2024

(30) Foreign Application Priority Data

Jan. 24, 2023 (GB) .................................... 2301018
Jul. 10, 2023 (GB) .................................... 2310547

(51) Int. Cl.
*G02F 1/313* (2006.01)
*G02F 1/31* (2006.01)

(52) U.S. Cl.
CPC ............ *G02F 1/311* (2021.01); *G02F 1/3132* (2013.01); *G02F 1/3136* (2013.01); *G02F 1/3137* (2013.01)

(58) Field of Classification Search
CPC ...... G02F 1/311; G02F 1/3132; G02F 1/3136; G02F 1/3137
USPC .......................................................... 385/17
See application file for complete search history.

(56) References Cited

U.S. PATENT DOCUMENTS

| | | | | | |
|---|---|---|---|---|---|
| 5,255,332 A | * | 10/1993 | Welch | ..................... | G02F 1/313 385/17 |
| 6,005,698 A | * | 12/1999 | Huber | ................ | H04Q 11/0005 398/55 |
| 6,317,529 B1 | * | 11/2001 | Kashima | ............ | H04Q 11/0005 385/24 |
| 6,347,168 B1 | * | 2/2002 | Shimomura | ....... | H04Q 11/0005 385/16 |

(Continued)

FOREIGN PATENT DOCUMENTS

| | | |
|---|---|---|
| CN | 110187521 A | 8/2019 |
| WO | WO 99/60434 | 11/1999 |
| WO | WO 2022/256904 | 12/2022 |

OTHER PUBLICATIONS

"Chalcogenide phase-change devices for neuromorphic photonic computing" by Pluckelmann et al, J. Appl. Phys. 129, paper 151103 (Year: 2021).*

(Continued)

*Primary Examiner* — Robert Tavlykaev
(74) *Attorney, Agent, or Firm* — Haynes and Boone, LLP

(57) ABSTRACT

An optical coupling device is presented. The optical coupling device comprises a plurality of input channels; a plurality of output channels; and a plurality of input coupling arrangements, or a plurality of output coupling arrangements, or a combination of both. Each input coupling arrangement has a coupling channel, and is configured to couple an optical signal propagating through a corresponding input channel into the coupling channel with an adjustable coupling coefficient. Each output coupling arrangement has a coupling channel and is configured to couple an optical signal propagating through the coupling channel into a corresponding output channel with an adjustable coupling coefficient.

16 Claims, 12 Drawing Sheets

(56) References Cited

U.S. PATENT DOCUMENTS

| | | | |
|---|---|---|---|
| 6,430,329 B1* | 8/2002 | Nir | H04Q 11/0005 385/20 |
| 6,792,176 B2* | 9/2004 | Nishi | H04Q 11/0005 385/24 |
| 9,360,629 B2* | 6/2016 | Watanabe | G02F 1/3137 |
| 11,099,456 B2 | 8/2021 | Rios et al. | |
| 11,556,312 B2* | 1/2023 | Sebastian | G06N 3/045 |
| 11,650,617 B2 | 5/2023 | Ocampo et al. | |
| 2001/0021289 A1 | 9/2001 | Nir | |
| 2002/0071628 A1* | 6/2002 | Zang | H04Q 11/0005 385/16 |
| 2002/0076141 A1* | 6/2002 | Duer | H04Q 11/0005 385/21 |
| 2002/0154853 A1* | 10/2002 | Duer | G02B 6/359 385/17 |
| 2003/0099429 A1 | 5/2003 | Cordina et al. | |
| 2003/0231821 A1* | 12/2003 | Clarke | H04Q 11/0005 385/16 |
| 2004/0131305 A1 | 7/2004 | Fouquet et al. | |
| 2006/0222361 A1* | 10/2006 | Aoki | H04Q 11/0005 398/51 |
| 2010/0150495 A1 | 6/2010 | Kawanishi et al. | |
| 2012/0019903 A1 | 1/2012 | Nakagawa | |
| 2012/0121219 A1* | 5/2012 | Yoshida | H04Q 11/0005 385/16 |
| 2016/0238795 A1* | 8/2016 | Tan | G02F 1/3138 |
| 2016/0274438 A1 | 9/2016 | Shimizu et al. | |
| 2022/0045757 A1* | 2/2022 | Pleros | G06N 3/0675 |
| 2023/0342596 A1 | 10/2023 | Pernice et al. | |

OTHER PUBLICATIONS

"On-chip Phase Change Optical Matrix Multiplication Core" by Li et al, IEEE International Electro Devices Meeting (IEDM), (Year: 2020).*

"Prototype WP-Based Optical Path Crossconnect Node Using Pi-Loss Optical Switches" by Nakajima et al, ECOC'98, pp. 251-252 (Year: 1998).*

Feldmann, J., et al., "Parallel convolutional processing using an integrated photonic tensor core", Nature 589, 52-58 (2021). https://doi.org/10.1038/s41586-020-03070-1.

Feldmann, J., et al., Supplemental Materials to "Parallel convolutional processing using an integrated photonic tensor core", Nature 589, 52-58 (2021). https://doi.org/10.1038/s41586-020-03070-1.

Poon, A. W. et al., "Cascaded Microresonator-Based Matrix Switch for Silicon On-Chip Optical Interconnection", Proceedings of the IEEE, Jul. 1, 2009, pp. 1216-1238, vol. 97, No. 7, ISSN: 0018-9219 figure 4a; table 1, IEEE, New York, US.

International Search Report and Written Opinion for International Application No. PCT/GB2024/050116 mailed Mar. 28, 2024 (13 pages).

* cited by examiner

OPTICAL COUPLING DEVICE WITH ADJUSTABLE COUPLING COEFFICIENT

CROSS REFERENCE TO RELATED APPLICATIONS

This application is a continuation of Great Britain Pat. Application No. 2310547.1, filed Jul. 10, 2023, which claims priority to Great Britain Pat. Application No. 2301018.4, filed Jan. 24, 2023, the contents of both of which are hereby incorporated by reference in its entirety as though fully set forth herein.

TECHNICAL FIELD

The present disclosure relates to an optical coupling device with adjustable coupling coefficient. In particular, the present disclosure relates to a configurable optical coupling device having a plurality of coupling arrangements with an adjustable coupling coefficient.

BACKGROUND

Optical matrix structures including matrix multiplications cells have been reported for enabling photonic computing, see for instance Feldmann, J., Youngblood, N., Karpov, M. et al. Parallel convolutional processing using an integrated photonic tensor core. Nature 589, 52-58 (2021). https://doi.org/10.1038/s41586-020-03070-1.

Conventional optical coupling devices such as optical switches are based on electro optic conversions. In this approach the optical input signals are converted to electrical signals, rerouted, and converted back to optical at the output. Such switch devices are generally slow and can be described as having a high latency. Alternative approaches have been proposed based on optical fibre architectures and/or the use of Micro Electronic Mechanical Systems (MEMS) modulators. Such systems are still limited by a relatively high latency, low efficiency due to optical losses and a lack of flexibility of use. Some MEMS may be designed with relatively low latency and optical losses but are generally hard to manufacture and have a limited number of switching cycles. Current systems may not be designed to perform signal replication.

Depending on their implementation some photonic matrix multipliers may have an inherent optical loss factor of 1/(MN) with M×N being the matrix/switch size, plus additional component loss. This loss is introduced by the requirement to equally split the incoming light between all columns (1/N) of the matrix and the incoherent addition of the individual matrix multiplication results (1/M).

It is an object of the disclosure to address one or more of the above mentioned limitations.

SUMMARY

According to a first aspect of the disclosure, there is provided an optical coupling device comprising a plurality of input channels; a plurality of output channels; and at least one of a plurality of input coupling arrangements, and and a plurality of output coupling arrangements; wherein each input coupling arrangement comprises a coupling channel, the input coupling arrangement being configured to couple an optical signal propagating through a corresponding input channel into the coupling channel with an adjustable coupling coefficient; and wherein each output coupling arrangement comprises a coupling channel, the output coupling arrangement being configured to couple an optical signal propagating through the coupling channel into a corresponding output channel with an adjustable coupling coefficient.

Optionally, the input coupling arrangements and/or the output coupling arrangements comprise a phase shift element.

Optionally, the phase shift element comprises an optical modulator.

For instance the optical modulator may be a thermal modulator, or a forward biased electro-absorption modulator (EAM), or a phase-change material (PCM) modulator, or a PN-phase shifter.

Optionally, wherein one or more coupling arrangements among the plurality of the input and output coupling arrangements are implemented as interferometers.

For instance the interferometer may be a Mach Zehnder interferometer.

Optionally, the interferometer has a first arm and a second arm arranged to form an input combiner-splitter and an output combiner-splitter.

For instance, the input and output combiner-splitters may be implemented using a directional coupler or a multimode interference MMI coupler.

Optionally, the coupling channel extends between a first end and a second end.

Optionally, each input channel extends along a corresponding longitudinal axis, and wherein the input channels are arranged substantially parallel to each other; and wherein the coupling channels are substantially perpendicular to the input channels.

Optionally, the coupling channel forms part of an input coupling arrangement at the first end, and the coupling channel forms part of an output coupling arrangement at the second end.

Optionally, the coupling channel forms part of an input or an output coupling arrangement at the first end, and the coupling channel is coupled to a directional coupler at the second end.

Optionally, the directional coupler is designed to combine optical signals with a predetermined ratio, or to split optical signals with a predetermined ratio.

For instance, the predetermined ratio may be selected to obtain an equal contribution from each input/output channel.

Optionally, the plurality of coupling channels forms at least one primary set of coupling channels configured to couple the plurality of input channels to a single output channel; and wherein the plurality of coupling channels forms at least one secondary set of coupling channels configured to couple a single input channel to a plurality of output channels.

Optionally, one or more coupling channels are provided with an optical amplifier.

Optionally, the coupling channel is a closed channel provided with an optical modulator to form a ring resonator.

Optionally, the ring resonator has an optical path length, and wherein when the optical path length is a multiple of an input wavelength of an input optical signal propagating through a corresponding input channel, the input optical signal couples to the ring resonator.

For instance the modulator may be operable to alter the optical path length of the ring resonator.

Optionally, the optical device comprises at least two sets of ring resonators, wherein each set comprises a plurality of ring resonators having a same resonant wavelength, and wherein the ring resonators of different sets have different resonance wavelengths.

Optionally, the optical device comprises a plurality of wavelength multiplexers, wherein each wavelength multiplexer is coupled to a wavelength specific channel.

Optionally, one or more input or output channels are provided with an optical amplifier.

Optionally, the optical coupling device comprises a controller configured to control the operation of a plurality of phase shift elements or optical modulators, and/or optical amplifiers.

Optionally, the optical coupling device is bi-directional.

According to a second aspect of the disclosure, there is provided a system comprising a plurality of optical coupling devices according to the first aspect, wherein each optical coupling device is configured to receive optical input signals at a specific wavelength.

Optionally, the system comprises a plurality of wavelength demultiplexers coupled to input ports of the plurality of optical coupling devices and a plurality of wavelength multiplexers coupled to output ports of the plurality of optical coupling devices.

According to a third aspect of the disclosure, there is provided an integrated optical chip comprising an optical coupling device according to the first aspect.

According to a fourth aspect of the disclosure, there is provided a method of manipulating an optical signal, the method comprising:

providing an optical coupling device comprising a plurality of input channels; a plurality of output channels; and at least one of a plurality of input coupling arrangements, and a plurality of output coupling arrangements; wherein each input coupling arrangement comprises a coupling channel, the input coupling arrangement being configured to couple an optical signal propagating through a corresponding input channel into the coupling channel with an adjustable coupling coefficient; and wherein each output coupling arrangement comprises a coupling channel, the output coupling arrangement being configured to couple an optical signal propagating through the coupling channel into a corresponding output channel with an adjustable coupling coefficient;

sending the optical signal through an input channel; and operating the plurality of coupling arrangements to manipulate the optical signal.

For instance, manipulating the optical signal may include performing a computational operation or replicating signals. For example the method may comprise combining several input signals to perform a computational operation.

According to a fifth aspect of the disclosure, there is provided system comprising a plurality of optical coupling devices, a plurality of wavelength demultiplexers coupled to input ports of the plurality of optical coupling devices and a plurality of wavelength multiplexers coupled to output ports of the plurality of optical coupling devices; wherein each optical coupling device is configured to receive optical input signals at a specific wavelength.

The optical coupling devices may be any optical switch configured to connect M optical input ports to N optical output ports in a configurable way. The optical coupling devices may be implemented in different fashions, for instance the optical coupling devices may be implemented as described in any of FIG. 2, 3, 4A, 6A, 6B, 7 or 9.

The options described with respect to the first aspect of the disclosure are also common to the second, third, fourth and fifth aspects of the disclosure.

DESCRIPTION OF THE DRAWINGS

The disclosure is described in further detail below by way of example and with reference to the accompanying drawings, in which.

DESCRIPTION

Figure 1:
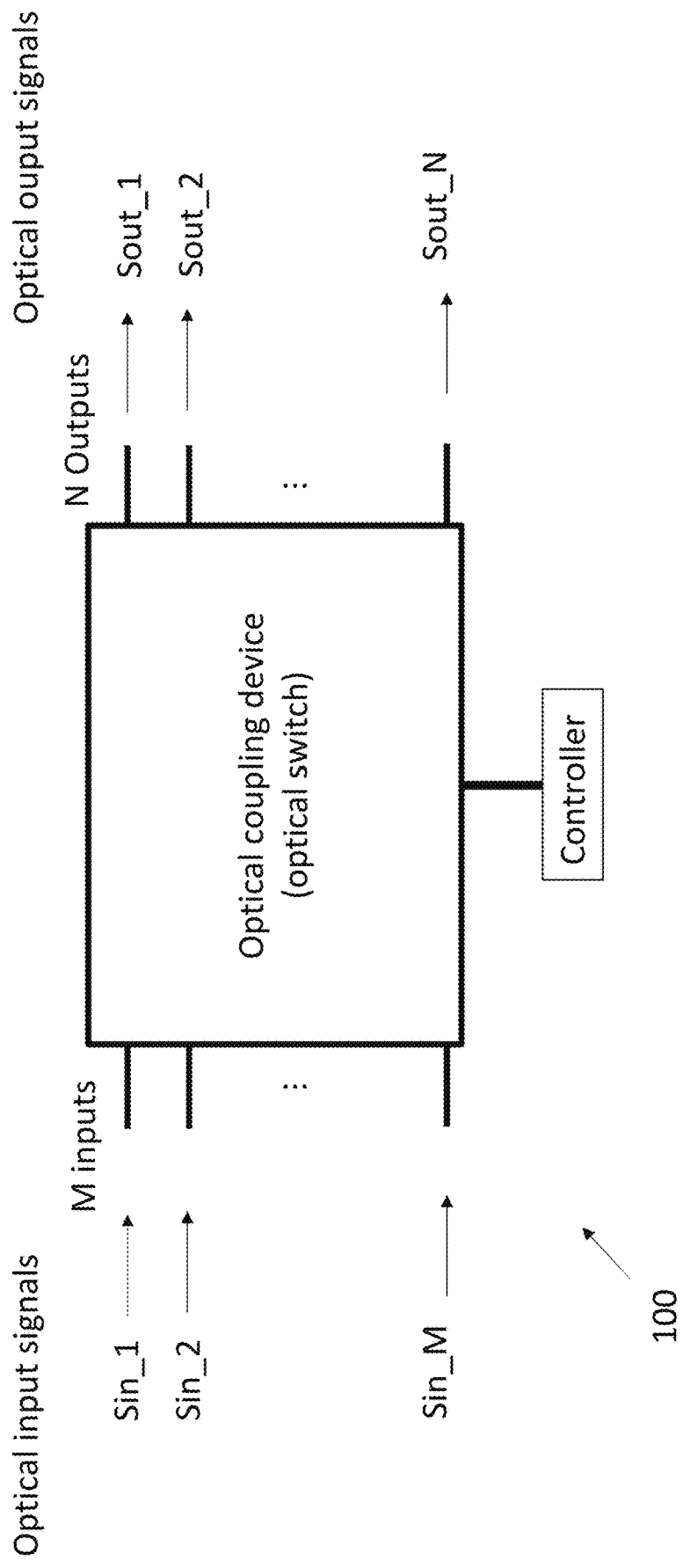
FIG. 1 is a schematic diagram of an optical coupling device.

FIG. 1 is a schematic diagram of an optical coupling device. The optical coupling device 100, also referred to as optical switch may be used for connecting M optical input ports to N optical output ports in a configurable way. The coupling device has M input channels, N output channels.

A plurality of coupling channels (not shown) is also provided. Each coupling channel is configured to couple an input channel to an output channel. The coupling channels are provided with dedicated amplitude adjusters configured to attenuate or amplify an optical signal. The amplitude adjusters may be optical modulators or optical amplifiers or a combination of both. A controller, such as an electronic controller or an optical controller is provided to control the operation of the amplitude adjusters.

The input ports are designed to receive optical input signals labelled Sin_1-Sin_M. The optical input signals may be generated by one or more optical sources and coupled to the input port. Depending on the type of optical source selected, optical coupling may be achieved using optical fibres, for example via grating couplers or edge coupling. Similarly, the output ports are configured to provide optical output signal Sout_1 to Sout_N. The optical coupling device 100 can be used to manipulate optical signals in various ways. For instance, the amplitude adjusters may be operated to replicate or duplicate one or more optical signals. The amplitude adjusters may also be operated to perform a computational task. For instance the controller may be configured to perform additions and/or multiplications of optical signals.

The optical input signals include information or data to be transmitted. A light source, such as a laser, may be used to generate an optical signal which is then modulated with the data to be transmitted. The device 100 is designed to route the input optical signals independently from the information or data present in them. The device/controller may be configured to route the signals in a predetermined fashion depending on the application. Such a device may be referred to as a layer 1 (L1) switch.

Figure 2:
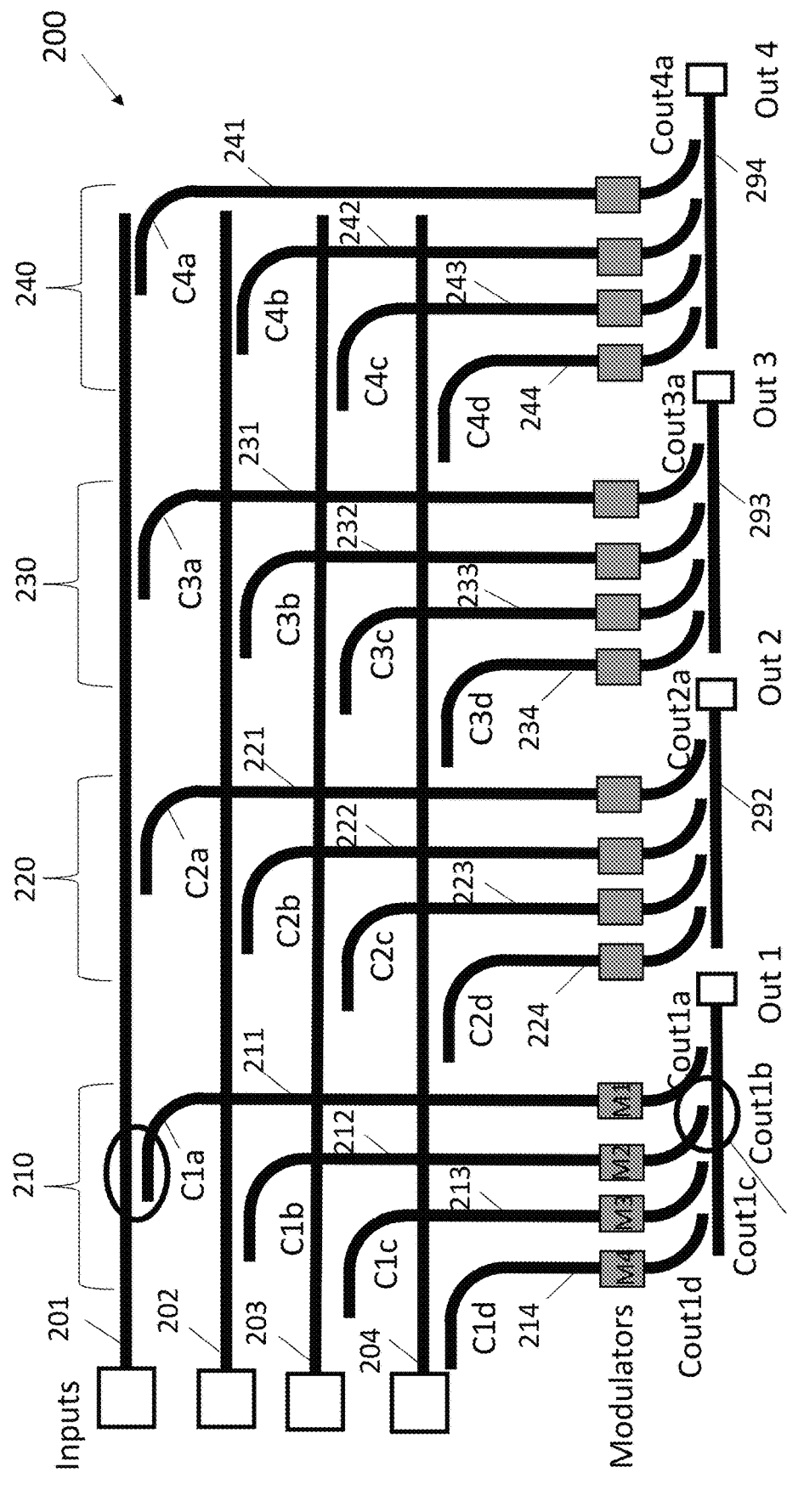
FIG. 2 is a diagram of an exemplary implementation of the optical coupling device of FIG. 1.

FIG. 2 is a diagram of an exemplary implementation of the optical coupling device of FIG. 1. The optical coupling device 200 has four input ports coupled to four input channels 201-204, and four output ports coupled to four output channels 291-294.

The coupling between the input channels and output channels is provided by four sets of coupling channels labelled 210, 220, 230, 240, referred to as primary sets. In each primary set the coupling channels are configured to couple the plurality of input channels to a single output channel.

The first set 210 has four coupling channels 211, 212, 213 and 214 configured to couple the input channels 201, 202, 203 and 204 to the first output channel 291. The coupling channel 211 is provided between the first input channel 201 and the first output channel 291; the coupling channel 212 is provided between the second input channel 202 and the first output channel 291; the coupling channel 213 is provided between the third input channel 203 and the first output channel 291; the coupling channel 214 is provided between the fourth input channel 204 and the first output channel 291.

Similarly, the second set 220 has four coupling channels 221, 222, 223 and 224 configured to couple the input channels 201, 202, 203 and 204 to the second output channel 292. The third set 230 has four coupling channels 231, 232, 233 and 234 configured to couple the input channels 201, 202, 203 and 204 to the third output channel 293. The fourth set 240 has four coupling channels 241, 242, 243 and 244 configured to couple the input channels 201, 202, 203 and 204 to the fourth output channel 294.

The device 200 is also provided with four secondary sets. In a secondary set the coupling channels are configured to couple a single input channel to a plurality of output channels. The coupling channels 211, 221, 231, and 241 form a first secondary set. The channels 212, 222, 232, and 242 form a second secondary set. The channels 213, 223, 233, and 243 form a third secondary set. The channels 214, 224, 234, and 244 form a fourth secondary set.

In this way each input channel may be coupled to a plurality of outputs. For instance, the first channel 201 is coupled to the first output channel 291 via the coupling channel 211, to the second output channel 292 via the coupling channel 221, to the third output channel 293 via the coupling channel 231, and to the fourth output channel 294 via the coupling channel 241.

It will be appreciated that the above arrangement may be extended to a number M of input channels and a number N of output channels in which M, and N are integers. So more generally each input channel is provided with a number N of coupling channels for coupling to N output channels.

Each coupling channel extends between a first coupler, also referred to as input coupler, coupled to an input channel; and a second coupler, also referred to as output coupler, coupled to the corresponding output channel. For instance, the coupling channel 211 extends between the input coupler C1$a$ at the input channel 201 and the output coupler Cout1$a$ at the output channel 291. Similarly the coupling channel 214 extends between the input coupler C1$d$ at the input channel 204 and the output coupler Cout1$d$ at the output channel 291.

The couplers may be implemented as directional couplers, or multimode interference splitters (MMIS) or Y-splitters. The input couplers are designed to split an incoming optical signal propagating through an input channel so that a portion of the signal, also referred to as intermediate signal, is directed to a coupling channel, while the remaining portion pursues its transmission through the input channel. Similarly, the output couplers are designed to combine an optical signal propagating through a coupling channel with another optical signal transmitted through an output channel.

The splitting ratio of the input couplers of a secondary set may be chosen such that each coupling channel provided along the input channel gets the same amount or amplitude of optical signal such that an input signal is distributed evenly between the N coupling channels of the secondary set. For the secondary set formed by 211, 221, 231 and 241, and assuming no losses, this would mean that the coupler C1$a$ couples ¼ of the input optical signal to the channel 211, the coupler C2$a$ couples ⅓ of the remaining optical signal to channel 221, the coupler C3$a$ couples ½ of the remaining optical signal to channel 231 and the coupler C4$a$ couples all (1/1) of the remaining optical signal to the channel 241. In this way each one of the coupling channels 211, 221, 231 and 241 receives a quarter of the total input optical signal received at the input port.

The splitting ratios of the output couplers of a primary set may be chosen to obtain an equal contribution from the M inputs to the output signal provided at the output port of the primary set. For the primary set 210 the splitting ratios of the output couplers Cout1$a$, Cout1$b$, Cout1$c$ and Cout1$d$, coupled to the first output channel 291 may be ¼, ⅓, ½ and 1/1, respectively.

In this example the output signal received at the output port is made of ¾ of the signals from coupling channels 212, 213 and 214 and ¼ from coupling channel 211. The signal received by the output channel 291 at the output of 212 is made of ⅔ of the signals from coupling channels 213 and 214 and ⅓ from coupling channel 212. The signal received by the output channel 291 at the output of 213 is made of ½ of the signal from coupling channel 214 and ½ from coupling channel 213. The signal received by the output channel 291 at the output of 214 is 100% (1/1) of the signal from coupling channel 214.

Depending on the device implementation, further adjustments may be required to consider optical losses at the crossing points between input channels and coupling channels as well as optical losses associated with the couplers. Overall, the ratios may be adjusted so that each input contributes the same amount of optical signal to each output.

Each coupling channel comprises an amplitude adjuster, which may be an optical attenuator or an optical amplifier or a combination of both. A controller (not shown) is provided to control the operation of the optical attenuators and/or optical amplifiers as dictated by the chosen design.

In the example of FIG. 2, each coupling channel is provided with an amplitude adjuster for modulating an optical signal transmitted through the coupling channel. For instance, the coupling channels 211, 212, 213 and 214 are provided with modulators M1, M2, M3 and M4 respectively. In this configuration the modulators can be densely packed, hence reducing the footprint of the device. In another implementation each modulator may be replaced by an optical amplifier or used in combination with an optical amplifier.

The modulators and/or amplifiers are used to control a degree transmission of a signal passing through the coupling channel. This permits to change the configuration of the coupling device. The modulators are configured to attenuate an optical signal with an adjustable attenuation coefficient. When the attenuation coefficient is maximum the optical signal is extinguished and cannot propagate. Similarly, if the attenuation coefficient is minimum (for instance zero), then the whole optical signal can propagate. In the case of an optical amplifier, the optical amplifier may have a transmission factor greater than 1, that account for the gain of the optical amplifier.

The output couplers are used to combine a modulated signal transmitted through a coupling channel with other modulated signals transmitted through other coupling channels.

In the example of FIG. 2, the input channels are linear channels arranged substantially parallel to each other's. The coupling channels have a linear portion provided between two curved portions of the input and output couplers. The linear portions of the coupling channels are substantially parallel to each other's and perpendicular to the input channels.

Depending on the design, the input channels and coupling channels may cross at several crossing points. Alternatively, the input channels and coupling channels may be provided in different planes so that they do not cross.

The optical coupling device 200 may be used as an optical switch for connecting M optical input ports to N optical output ports in a reconfigurable way with ultra-low latency. The device 200 also enables replication of input signals from one to many connections. The selection of which input is connected to which output can be freely reconfigured at high speed (for instance at GHz frequency) by controlling the attenuators and/or amplifiers. The device avoids electro-optic conversion of the input signals and therefore enables ultra-low latency (only time of flight of the optical signal, for instance less than 1 ns). An additional advantage is the capability to replicate signals. Stated another way, an input optical signal on one input port can be sent to multiple output ports. This can be achieved while compensating for optical losses so that the intensity of the replicated output optical signals is sufficient for detection or further processing.

Figure 3:
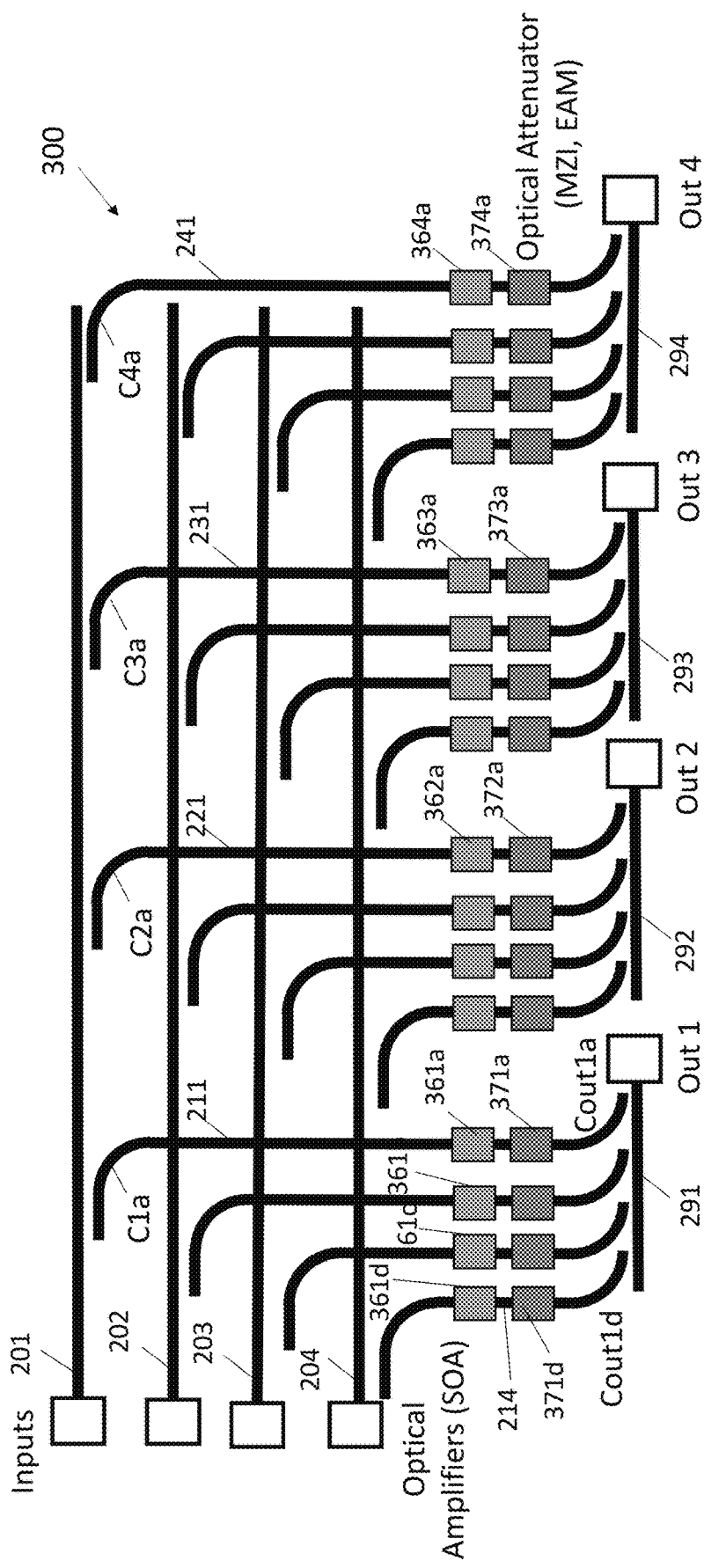
FIG. 3 is a diagram of another exemplary implementation of the optical coupling device of FIG. 1.

FIG. 3 is a diagram of another exemplary implementation of the optical coupling device of FIG. 1. The device 300 has the same architecture as the device 200 of FIG. 2, and same reference numerals are used to label corresponding components. In this implementation each coupling channel is provided with both an optical amplifier and an optical attenuator. For example the coupling channel 211 is provided with optical amplifier 361a and optical attenuator 371a. Similarly coupling channel 214 is provided with optical amplifier 361d and optical attenuator 371d.

The optical amplifiers may be implemented as a semiconductor optical amplifiers SOAs. The optical attenuators may be Mach Zehnder modulators (MZMs) also referred to as Mach Zehnder interferometers (MZIs), or electro-absorption modulators (EAMs), or micro-ring resonators, or a phase-change material (PCM) modulators.

An attenuator can be used to cancel or extinct an optical signal that should not be transferred to an output port. In this scenario the amplifier is turned off and the attenuator is turned on. The amplifier/attenuator combination may be implemented using a same component or as two separate components. An adjuster component, such as for instance an SOA, may be designed to perform signal amplification when a positive voltage is applied to it, and to perform signal attenuation when a negative voltage is applied to it.

In operation, an optical input signal propagates through an input channel, for instance input channel 201, and the input couplers C1a-C4a direct a portion of the optical input signal to the coupling channels 211, 221, 231 and 241, respectively. When an optical amplifier located on one of these coupling channels is turned on, the optical signal propagating through the channel is amplified. This can be used to recover optical losses in the optical circuit. By turning on multiple optical amplifiers connected to a same input port, multiple output ports can be addressed to perform signal replication.

As explained above with reference to FIG. 2, the splitting ratios of the input couplers C1a, C2a, C3a and C4a may be selected such that each coupling channel receives % A of the input optical signal. If the optical amplifiers 361a, 362a, 363a and 364a are all turned on, then each one of the coupling channels 211, 221, 231 and 241 may provide a same amplified optical signal at the output channels 291, 292, 293 and 294. Assuming that optical losses are the same in each coupling channel, this may be achieved using a same amplification coefficient for each one of the amplifiers 361a-364a. Alternatively different amplification coefficient may be used to compensate for different optical losses.

The optical attenuators may be used to prevent an optical signal propagating through a coupling channel from being transmitted to an output channel. For instance, the optical attenuators 371a, 372a, 373a and 374a may be turned off, while all the other remaining attenuators are turned on to prevent propagation of input signals arising from input channels 202, 203 and 204 to contribute to the output signal at the output ports 1-4. In this example the input optical signal received at the input channel 201 would be replicated four times at the output ports 1 to 4.

Replicated output signals have the same profile as the input signal but may have a different amplitude. As explained above, the provision of amplifiers permits to compensate for optical losses or even to amplify the signal above the level of the input signal. The level of amplification may be chosen based on the sensitivity of an optical detector for sensing the output signals.

It will also be appreciated that the circuit of FIG. 3 could be implemented with only the optical attenuators and no optical amplifier, although in this case the input signal amplitude would be reduced by >1/(N*M).

The optical switches of FIGS. 2 and 3 split the input signal into N parts regardless of where the light needs to go. This in turn introduces a systematic loss factor of 1/N, which is undesirable. Another loss factor of 1/M is also introduced by combining the channels with equal splitting ratios at the output.

Figure 4B:
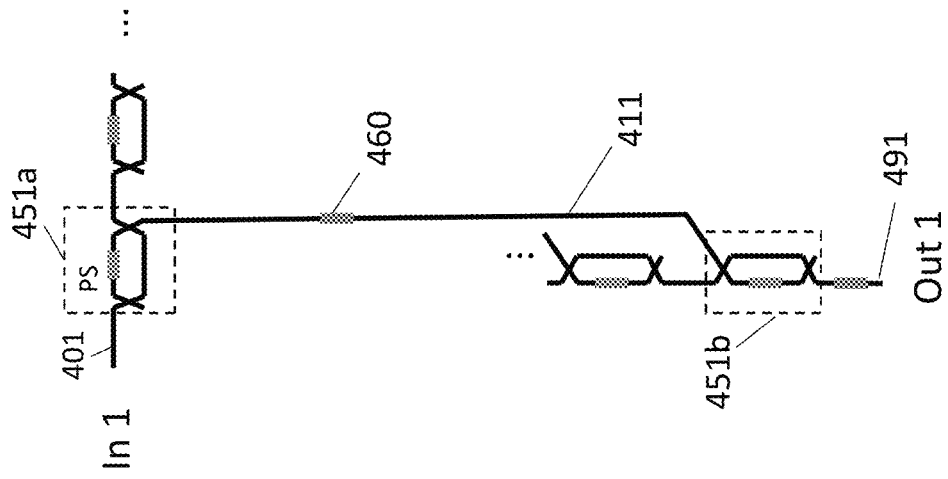
FIG. 4B is a selected portion of the optical coupling device of FIG. 4A showing an input channel coupled to an output channel.
Figure 4A:
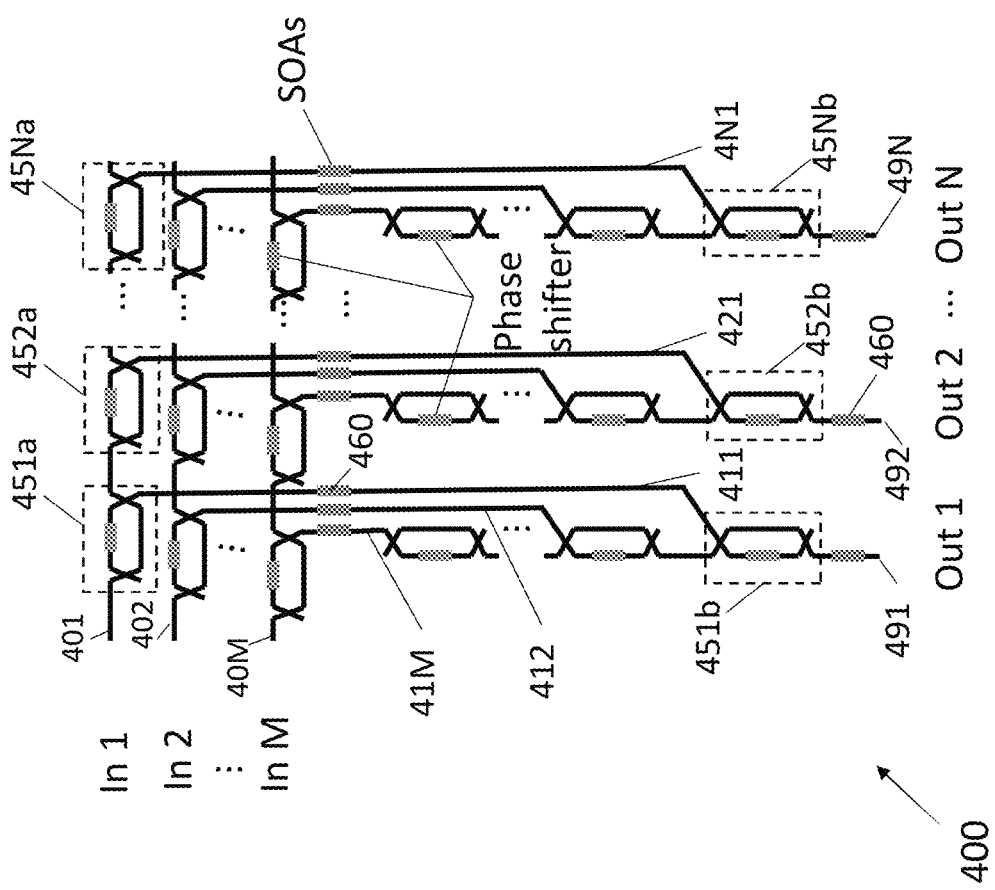
FIG. 4A is a diagram of an optical coupling device with adjustable coupling coefficient.

FIG. 4A is a diagram of an optical coupling device with adjustable coupling coefficient. The optical coupling device 400 is similar to the coupling device of FIG. 2 or 3, however in this case the input and output couplers have been replaced by coupling arrangements with adjustable coupling coefficient.

The optical coupling device 400 has M input ports coupled to M input channels 401-40M, and N output ports coupled to N output channels 491-49N. The reference numbers are only provided for clarity, and it will be appreciated that the number of input and output ports may be any integer as required by the application of the optical coupling device.

The coupling between the input channels and output channels is provided by N sets of coupling channels referred to as primary sets. In each primary set the coupling channels are configured to couple the plurality of input channels to a single output channel.

The first set has M coupling channels 411, 412 . . . 41M configured to couple the input channels 401, 402 . . . 40M to the first output channel 491. The coupling channel 411 is provided between the first input channel 401 and the first output channel 491; the coupling channel 412 is provided between the second input channel 402 and the first output channel 491; the coupling channel 41M is provided between the input channel 40M and the first output channel 491. Similarly, a second set of primary channels couples the input channels 401, 402 . . . 40M to the second output channel 492.

The device 400 is also provided with M secondary sets. In a secondary set the coupling channels are configured to couple a single input channel to a plurality of output channels. For example the coupling channels 411, 421 . . . 4N1 form a first secondary set. In this way each input channel may be coupled to a plurality of outputs. For instance, the first channel 401 is coupled to the first output channel 491 via the coupling channel 411, to the second output channel 492 via the coupling channel 421, and to the Nth output channel 49N via the coupling channel 4N1.

Each coupling channel extends between a first coupling arrangement, also referred to as input coupling arrangement, coupled to an input channel; and a second coupling arrangement, also referred to as output coupling arrangement, coupled to the corresponding output channel.

For instance, the coupling channel 411 extends between the input coupling arrangement 451a at the input channel 401 and the output coupling arrangement 451b at the output channel 491. Similarly the coupling channel 4N1 extends between the input coupling arrangement 45Na at the input channel 401 and the output coupling arrangement 45Nb at the output channel 49N.

Each coupling channel may be provided with an optical amplifier 460. The optical amplifier may be implemented as a semiconductor optical amplifier SOA. The SOAs are used to recover optical loss, but as the large loss factors of 1/(MN) is reduced the gain needed is far less than in the optical switches of FIGS. 2 and 3. The position and the number of optical amplifiers can be changed depending on how much losses can be tolerated.

FIG. 4B is a selected portion of the circuit of FIG. 4A showing an input channel coupled to an output channel. The coupling channel 411 extends between a first end and a second end. The coupling channel 411 forms part of the input coupling arrangement 451a at the first end, and of the output coupling arrangement 451b at the second end. The coupling arrangements are implemented as interferometers. For instance, the input coupling arrangement 451a has two arms: a first arm provided by the input channel 401, and a second arm provided by the coupling channel 411. The second arm includes an optical phase shifter PS. The input coupling arrangement 451a is therefore configured to couple an optical signal propagating through the input channel 401 into the coupling channel 411 with an adjustable coupling coefficient.

Similarly, the output coupling arrangement 451b has a first arm provided by the output channel 491, and a second arm provided by the coupling channel 411. The second arm includes an optical phase shifter PS. The output coupling arrangement 451b is therefore configured to couple an optical signal propagating through the coupling channel 411 into the output channel 491 with an adjustable coupling coefficient.

Figure 5:
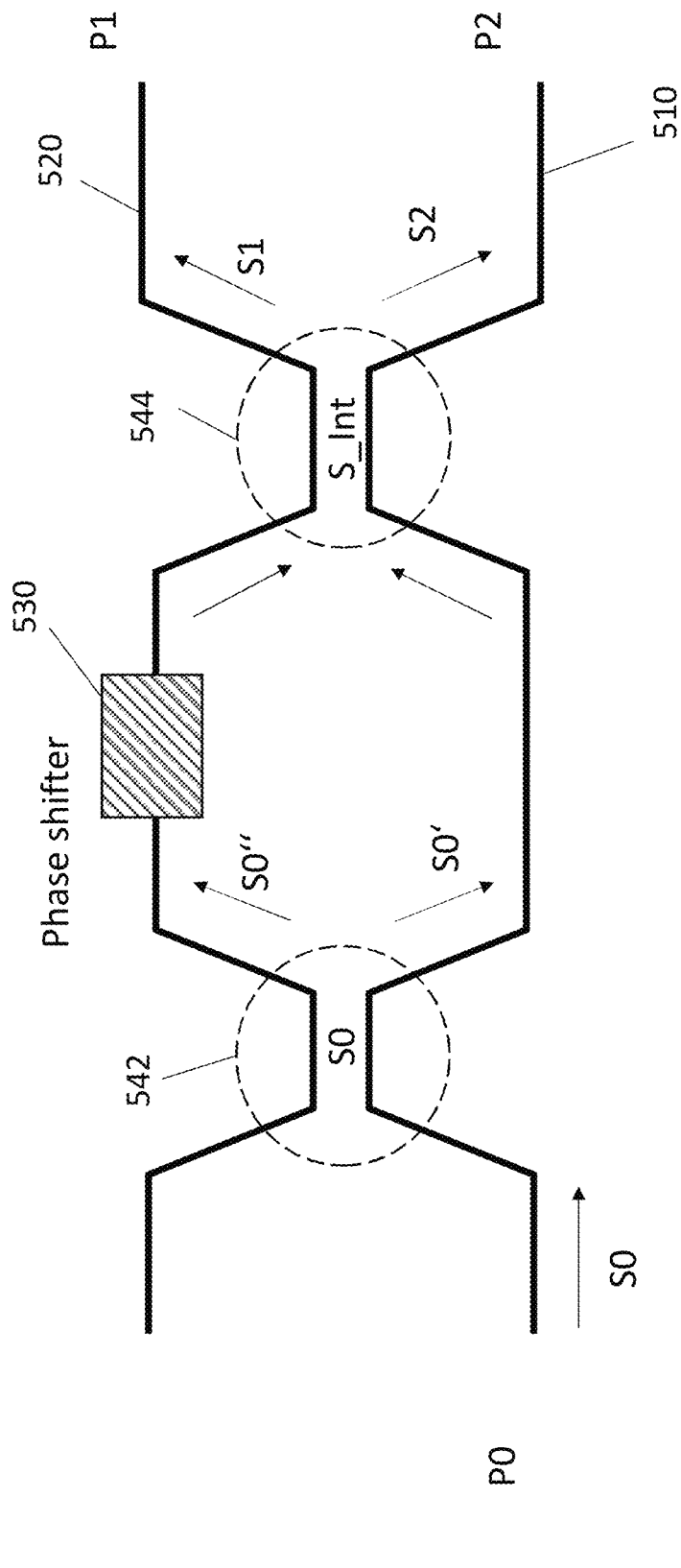
FIG. 5 is diagram of a coupling arrangement implemented as a Mach Zehnder interferometer.

FIG. 5 is diagram of a coupling arrangement implemented as a Mach Zehnder interferometer. The coupling arrangement 500 has a first arm 510 and a second arm 520. The second arm 520 includes an optical phase shifter 530. The coupling arrangement 500 may be used in the circuit of FIG. 4A.

It will be appreciated that in another embodiment, the optical phase shifter 530 may be provided in the first arm 510. In yet another embodiment two phase shifters may be provided, one phase shifter in each arm.

An input combiner-splitter 542 is provided at the input of the coupling arrangement 500 for splitting an input optical signal S0 propagating along the first arm 510 between a first signal S0' propagating along the first arm 510 and a second signal S0" propagating along the second arm 520. The input combiner-splitter 542 may provide a 50:50 splitting ratio, so that S0' and S0" have the same intensity. Similarly, an output combiner-splitter 544 is provided at the output of the coupling arrangement 500.

The input and output combiner-splitters 542, 544 may be implemented in different ways. For instance, using a directional coupler or a multimode interference MMI coupler.

In operation the phase shifter 530 induces a phase shift between the signal S0' and the signal S0". The output combiner-splitter 544 receives the signals S0' and S0" and generates an interference signal S_Int. Depending on their phase difference, the signals S0' and S0" interfere either constructively or destructively.

Various scenarios can be envisaged. When constructive interferences occur on the second arm 520, and destructive interferences occur on the first arm 510 then the interference signal S_Int propagates through the second arm 520, and no signal propagates via the first arm 510. Similarly, when constructive interferences occur on the first arm 510, and destructive interferences occur on the second arm 520 then the interference signal S_Int propagates through the first arm 510, and no signal propagates via the second arm 520.

Some constructive interferences may also occur on both arms 510 and 520, in which case the interference signal S_Int is split by the output combiner-splitter 544 between the first arm and the second arm. Various splitting ratios are possible depending on the degree of interference in each arm. Therefore, since the coupling coefficient is adjustable, the splitting ratio is also adjustable.

The signals S1 and S2 have an optical power $P_1$ and $P_2$, respectively defined as: $P_1 = P_0 \cdot \cos^2(\Delta\phi)$; and $P_2 = P_0 \cdot \sin^2(\Delta\phi)$, with $P_0$ being the optical power of the signal S0, and $\Delta\phi$ being the phase difference between S0' and S0". So the splitting ratio between the signals S1 and S2 depends on phase difference $\Delta\phi$. A controller (not shown) is provided to operate the phase shifter and determine the phase shift to be introduced between S0' and S0".

Therefore, the coupling arrangement 500 is configured to couple an input optical signal into the coupling channel 520 with an adjustable coupling coefficient. When the coupling coefficient is 1, 100% of the input signal is coupled to the coupling channel 520. When the coupling coefficient is 0, 100% of the input signal is transmitted through the input channel 510. When the coupling coefficient is 50, 50% of the input signal is coupled to the coupling channel 520 and the remaining 50% is transmitted through the input channel 510.

The coupling arrangement 500 may be used to implement the various input coupling arrangements and output coupling arrangements in the circuit of FIG. 4A.

The phase-shifter 530 may be implemented in different ways. For instance the phase shifter 530 may be a PN-phase shifter, or a thermal modulator, or a forward biased electro-absorption modulator (EAM), or a phase-change material (PCM) modulator. The phase shift modulator 530 may be made of different materials including for instance silicon, silicon nitride, InP, lithium niobate, a polymer, graphene, among others.

The optical arrangement 500 forms an interferometer structure, that may be referred to as Mach Zehnder modulator (MZM) structure or as Mach Zehnder interferometer (MZI) structure. The MZMs act as tuneable splitters. In this way the light is not split equally to all columns all the time, but is specifically directed to the desired output. It reduces loss and also crosstalk between channels.

In FIG. 4A, the use of the optical arrangements 451a, 452a . . . 45Na permits to direct a desired amount of signal to the coupling channels 411, 421 . . . 4N1 by adjusting the coupling coefficient of each optical arrangement.

The default state may be chosen so that the light is transmitted straight through the optical arrangement. When the correct coupling channel is reached the coupling arrangement is operated to transfer the optical signal to the coupling channel. If the optical signal needs to be transferred to multiple output ports, then the coupling coefficient/splitting ratio of the coupling arrangement is adjusted accordingly.

For instance the optical arrangements 451a, 452a . . . 45Na may be controlled such that 100% of the input signal received at the input channel 401 is coupled to the coupling channel 421. Alternatively the optical arrangements 451a, 452a . . . 45Na may be controlled such that 50% of the input signal is coupled to coupling channel 411 and 50% to the coupling channel 421. This approach allows to directly guide the input signal to a specific output without splitting light to any other output where it is not required. To recover optical losses, the signal passes through an SOA. At the output stage M column channels may be combined into one output. In the implementation of FIG. 2, this was achieved by setting equal splitting ratios between all of them, so that in total a loss of 1/M was introduced.

As only one input is transmitting to a certain output at a time, one can remove this loss factor in the same way as for the inputs and adjust the splitting ratios of the coupling arrangement to couple only the correct input to the output channel. Another stage of optical amplifiers 460 at the output can be used to further decrease or compensate for optical losses. The reduction of the optical losses means that less gain is needed which decreases requirements for the SOA. In turn this reduces power consumption and permit to implement a device with a smaller footprint.

Figure 6A:
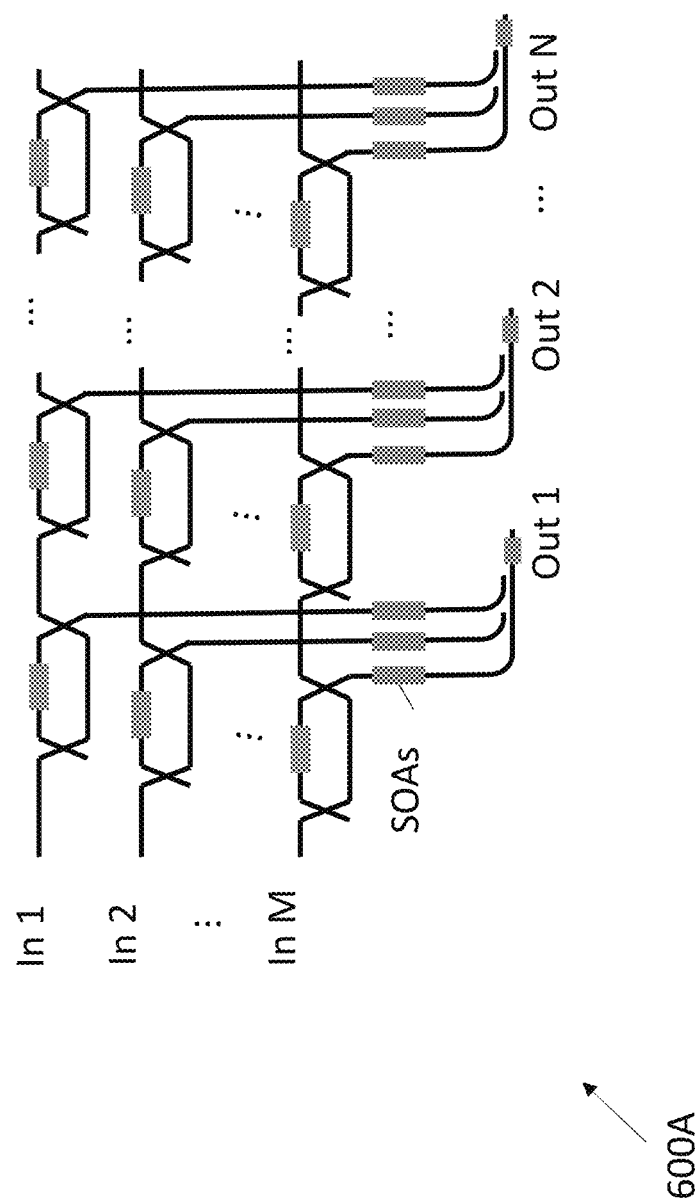
FIG. 6A is a diagram of another optical coupling device with adjustable coupling coefficient.

FIG. 6A is another diagram of an optical coupling device with adjustable coupling coefficient. The optical coupling device 600A is similar to the optical coupling device 400 of FIG. 4, however in this case the optical coupling arrangements 451b, 452b and 45Nb are replaced with output couplers with fixed splitting ratios. This reduces the number of phase shifters required and the footprint of the device.

Figure 6B:
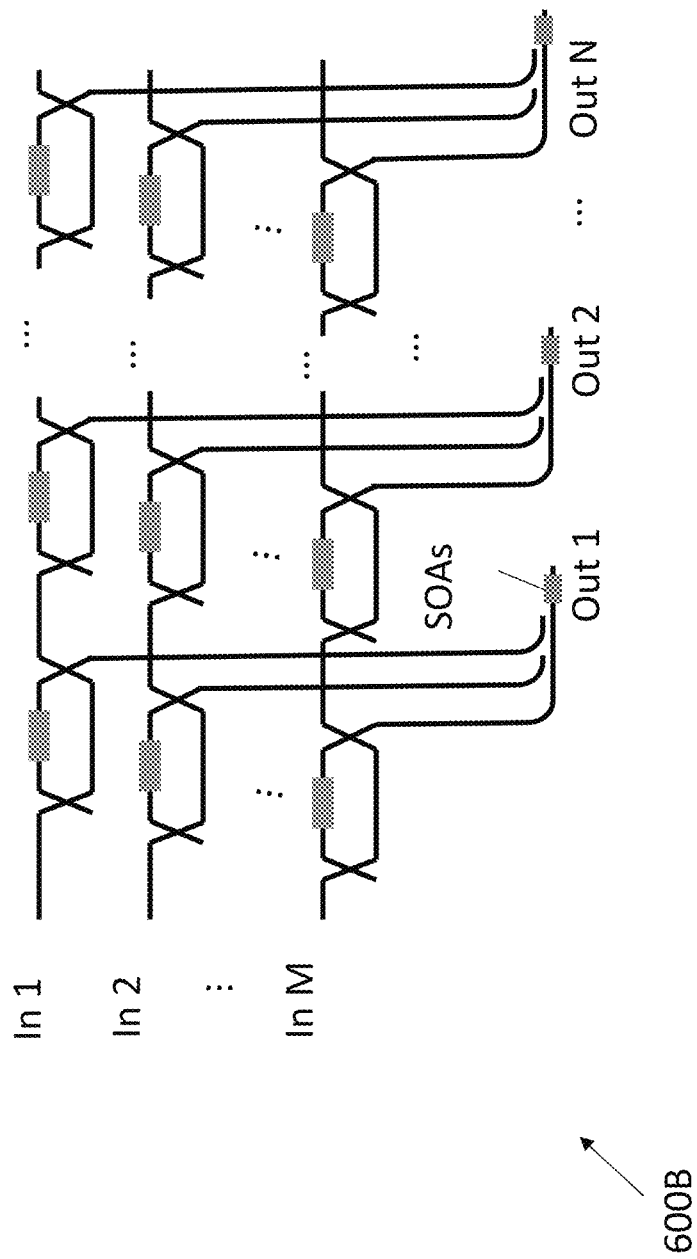
FIG. 6B is a diagram of a modified version of the optical coupling device of FIG. 6A.

FIG. 6B is a modified version of the optical coupling device of FIG. 6A. The optical coupling device 600B is similar to the optical coupling device 600A, however in this case the optical amplifiers (such as SOAs) are only provided on the output channels and not on the coupling channels.

Of course, it will be appreciated that further variations of the optical switches shown in FIGS. 4, 5 and 6 may be envisaged, including the number and position of fixed couplers, number and position of optical amplifiers etc.

The optical switches of FIGS. 6A and 6B offer a trade-off between footprint and reduced optical loss. The number of active components (phase-shifters and SOAs) is significantly reduced in these arrangements.

It will be appreciated that the devices of FIGS. 6A and 6B can be operated in both directions. This mean that that an input signal may be sent through the output channels. Stated another way the input and output channels may be swapped so that the output channels become input channels and the input channels become output channels.

Having the fixed splitting ratios at the input stage might be beneficial in applications involving signal replication. In the standard implementation with adjustable splitting at the input, the signal arriving at the respective SOAs decreases with the number of replications (as the initial MZMs only couple part of the light to the column). This would have to be corrected by the SOA at the output (by increasing the gain).

Figure 7:
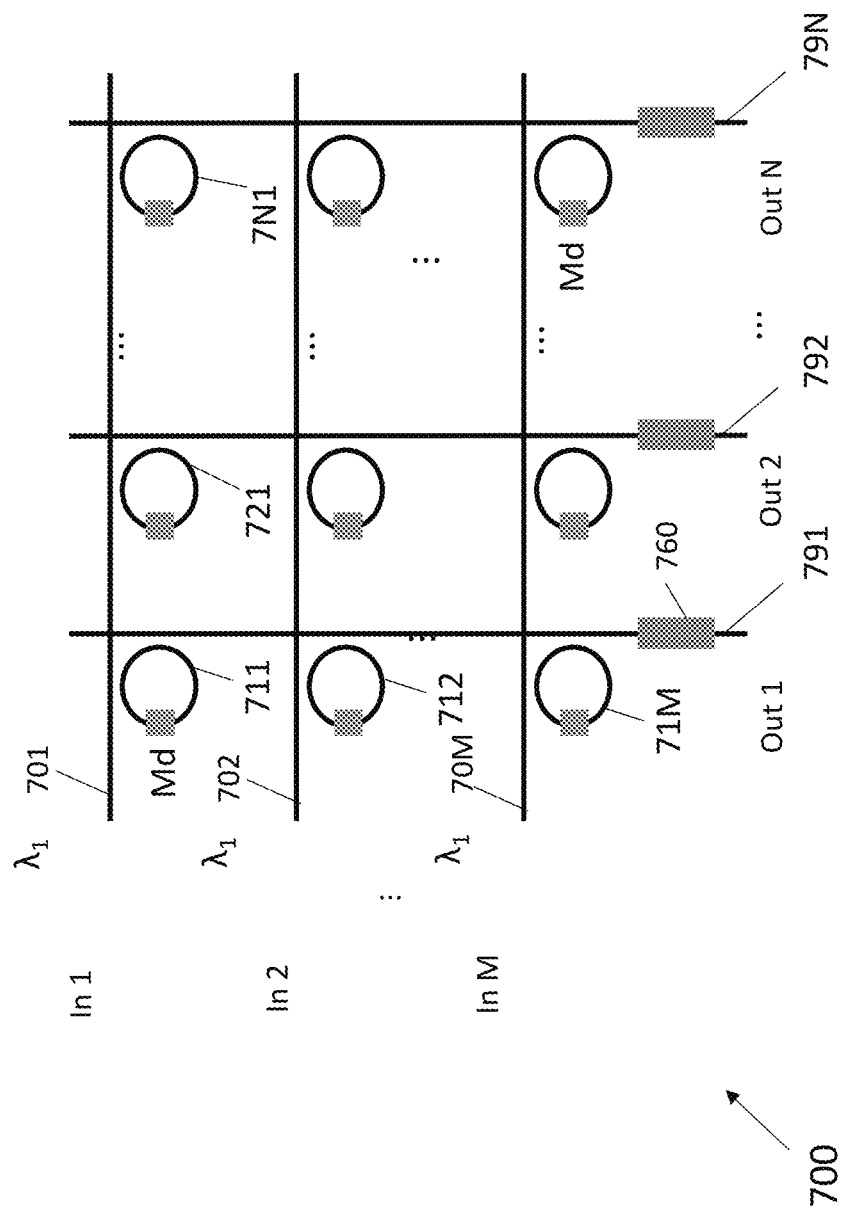
FIG. 7 is diagram of another optical coupling device with adjustable coupling coefficient.

FIG. 7 is another diagram of an optical coupling device with adjustable coupling coefficient. The optical coupling device 700 has M input ports coupled to M input channels 701-70M, and N output ports coupled to N output channels 791-79N. The coupling between the input channels and output channels is provided by N sets of coupling channels referred to as primary sets. In each primary set the coupling channels are configured to couple the plurality of input channels to a single output channel. The first set has M coupling channels 711, 712 . . . 71M configured to couple the input channels 701, 702 . . . 70M to the first output channel 791. Similarly, a second set of primary channels couples the input channels 701, 702 . . . 70M to the second output channel 792.

The device 700 is also provided with M secondary sets. In a secondary set the coupling channels are configured to couple a single input channel to a plurality of output channels. For example, the coupling channels 711, 721 . . . 7N1 form a first secondary set. In this way each input channel may be coupled to a plurality of outputs. For instance, the first channel 701 is coupled to the first output channel 791 via the coupling channel 711, to the second output channel 792 via the coupling channel 721, and to the Nth output channel 79N via the coupling channel 7N1.

Each coupling channel is a closed channel provided with a modulator Md to form a ring resonator also referred to as optical micro-ring modulator. Each ring resonator is arranged in a so-called add-drop configuration, which means that two channels are coupled to the ring resonator (the horizontal input channel and the vertical output channel in this case). For instance the coupling channel 711 is a ring channel for coupling the first input channel 701 to the first output channel 791. Similarly, the coupling channel 712 is a ring channel for coupling the second input channel 702 to the first output channel 791, etc.

Each ring resonator forms a coupling arrangement configured to couple an optical signal propagating through a corresponding input channel into the coupling channel with an adjustable coupling coefficient. Each output channel may be provided with an optical amplifier 760, such as an SOA. A ring based implementation also removes the loss factor of 1/(M*N).

In operation, if the input signal having the wavelength $\lambda 1$ is on resonance with the ring resonator, then the signal is coupled to the ring resonator and transferred to the corresponding output channel. If on the other hand the input signal is off-resonance with the ring resonator, then the input signal is carried through the input channel. The modulator Md permits to tune the resonance of the ring resonator and therefore the coupling coefficient of the coupling arrangement. Various coupling coefficients can be obtained. This is because the resonance peak has a certain width depending on the quality factor of the resonator. A slope may be defined between off-resonance and fully on resonance. Different splitting ratios can be achieved along this slope.

The optical amplifiers 760 are used to recover losses in the ring resonators.

This approach is ideally used with a single input wavelength. If the input signal has multiple wavelengths the ring resonators need to be carefully designed and tuned so that the free spectral range (FSR) of the ring matches the wavelengths spacing. The free spectral range may be defined as the distance in the optical spectrum (optical frequency or wavelength) at which the resonance of the ring's repeats (optical maxima).

Depending on the application, the optical signals received at the input channels 701-70M may have a same wavelength $\lambda 1$ (or range of wavelengths), or different wavelengths $\lambda i$ (or range of wavelengths). For instance, when using the circuit 700 as a matrix multiplier, the input optical signals may all have different input wavelengths.

Figure 8B:
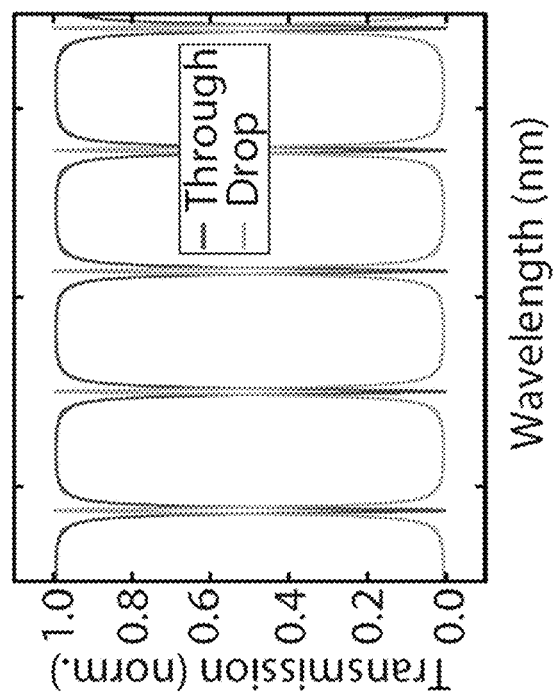
FIG. 8B is a plot of the transmission spectrum for the ring resonator of FIG. 8A.
Figure 8A:
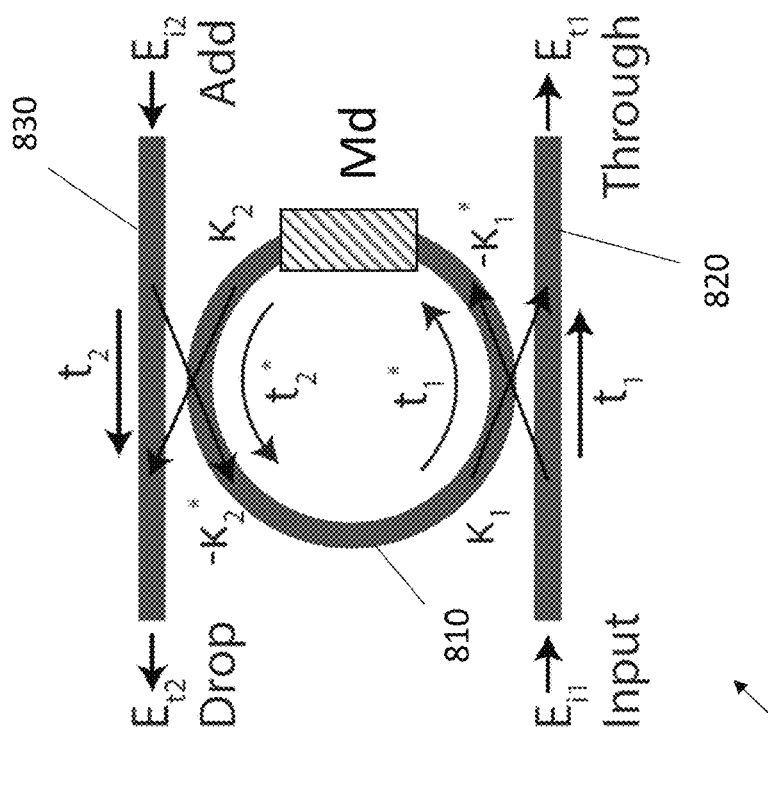
FIG. 8A is a diagram illustrating the operation of a ring resonator in add-drop configuration.

FIG. 8A is a diagram illustrating the operation of a ring resonator in add-drop configuration. The ring resonator 810 is coupled to a first (input) waveguide 820 and a second (output) waveguide 830. In this example the first and second waveguides are parallel to each other, but could be arranged differently, for instance perpendicular to each other as in FIG. 7. The ring waveguide 810 is provided with a modulator Md. The modulator may be operated to alter the refractive index of the ring waveguide and therefore its optical path length.

The input waveguide 820 is in close vicinity (typically <1 µm) to the ring waveguide 810 so that light can evanescently couple to the ring. Similarly, the output waveguide 830 is also provided in close vicinity to the ring waveguide 810. The input waveguide 820 extends between an input port and a through port. Similarly, the output waveguide 830 extends between an add port and a drop port.

In operation an input optical signal that is received at the input port leaves either at the through port of the waveguide 820 or at the drop port of the waveguide 830.

For on-resonance condition, the optical path length of the ring resonator matches a multiple of the wavelength of the input optical signal, following the equation $2\pi r n_{\mathit{eff}} = m\lambda$, in which $n_{\mathit{eff}}$ is the effective refractive index of the waveguide. As a result, the optical signal couples to the ring resonator and leaves at the drop port.

For the off-resonance condition the optical path length of the ring resonator does not match a multiple of the wavelength of the input optical signal. As a result, the optical signal does not couple to the ring resonator (interferes destructively) and all the light leaves at the through port.

In a simple picture the first photons that arrive are split between through port and ring (as in a directional coupler). A bit later when the first photons in the ring have made one round trip and arrive at the coupling point they interfere with the light coming from the input. If the light that is now coupled out of the ring interferes destructively with the light going straight to the through port, then no light leaves at the through port. Similarly, if the light is on resonance with the ring, the constructive interferences occur inside the ring and the light can leave at the drop port.

FIG. 8B is a plot of the transmission spectrum for the ring resonator of FIG. 8A. The transmission spectrum shows that: off resonance wavelengths are transmitted to the through port, on-resonance light leaves at the drop port. The resonances repeat at a certain distance (which is called free spectral range (FSR)).

The complex mode amplitude (E-fields) at the through and drop port can be expressed as:

$$E_{t1} = \frac{t_1 - t_2^* \alpha e^{i\theta}}{1 - t_1^* t_2^* \alpha e^{i\theta}}$$

$$E_{t2} = \frac{-\kappa_1^* \kappa_2 \sqrt{\alpha} \, e^{i\theta/2}}{1 - t_1^* t_2^* \alpha e^{i\theta}}$$

In which t1 and t2 are complex coupling factors, a is the ring resonator loss factor, and $\theta$ is a geometry factor expressed as a function of the radius r and the wavelength $\lambda$ as $\theta = 4\pi c^2 n_{\mathit{eff}} r / \lambda$.

This translates into the optical powers:

$$P_{through} = |E_{t1}|^2$$

$$P_{drop} = |E_{t2}|^2$$

Figure 9:
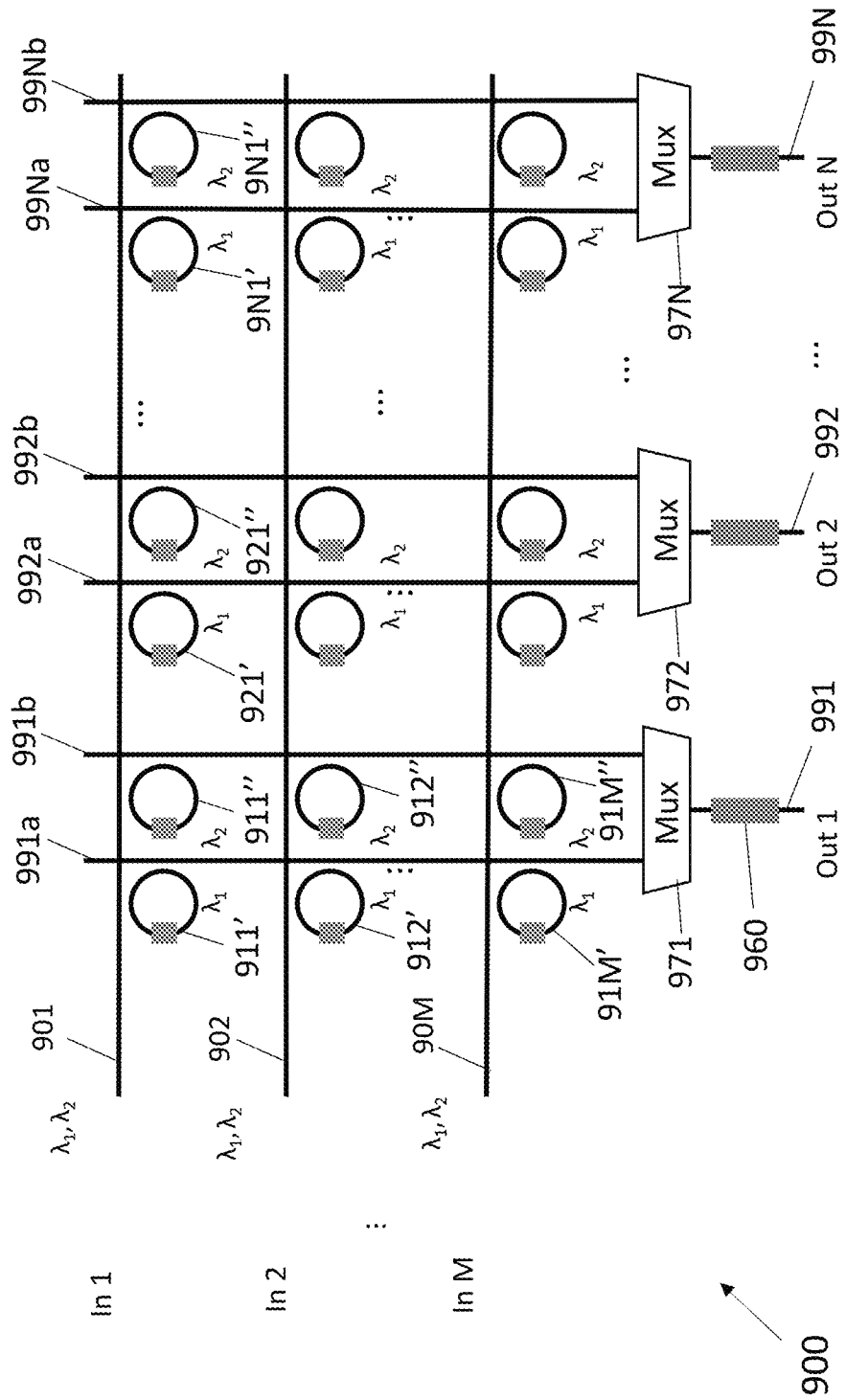
FIG. 9 is a modified version of the optical coupling device of FIG. 7.

FIG. 9 is a modified version of the optical coupling device of FIG. 7. The optical coupling device 900 is similar to the device 700 of FIG. 7. In this case multiple ring resonators are provided with different resonant wavelengths.

For instance the input channel 901 is provided with a first ring resonator 911' coupled to output channel 991a and a second a second ring resonator 911" coupled to output channel 991b. The ring resonator 911' has a resonant wavelength $\lambda 1$, while the ring resonator 911" has a resonant wavelength $\lambda 2$.

Similarly, the input channel 902 is provided with a first ring resonator 912' coupled to output channel 991a and a second a second ring resonator 912" coupled to output channel 991b, etc.

The output channels 991a and 991b are coupled to a wavelength multiplexer 971. The output of the multiplexer is coupled to a single output channel 991, which may be provided with an amplitude amplifier 960.

Similarly, the output channels 992a and 992b are coupled to a wavelength multiplexer 972, etc.

It will be appreciated that the architecture of the optical switch 900 may be extended to more wavelengths by adding additional output channels and additional ring resonators with different resonant wavelengths.

The topology of the optical switch 900 removes the need for precise alignment of the FSR with the channel spacing. It also enables wavelengths selective switching.

Figure 10:
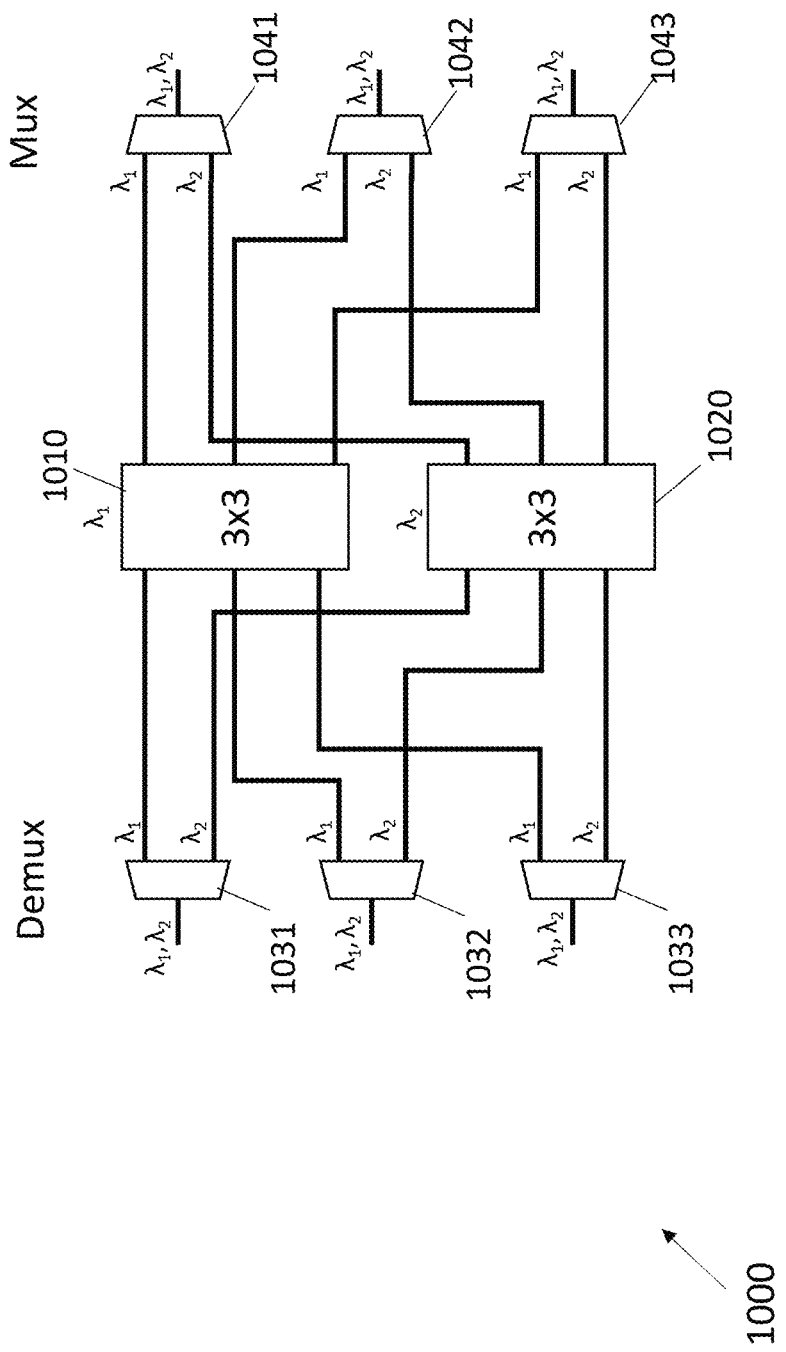
FIG. 10 is a diagram of a system for wavelength selective switching.

FIG. 10 is a diagram of a system for wavelength selective switching. The system 1000 comprises a first optical switch 1010 and a second optical switch 1020. The first optical switch 1010 is configured to receive optical input signals at the wavelength $\lambda 1$, while the second optical switch 1020 is configured to receive optical input signals at the wavelength $\lambda 2$. The first optical switch 1010 may be implemented as the optical switch 700 of FIG. 7 with ring resonators having a resonant wavelength $\lambda 1$. Similarly, the second optical switch 1020 may be implemented as the optical switch 700 with ring resonators having a resonant wavelength $\lambda 2$.

A set of wavelength demultiplexers 1031, 1032, 1033 is provided to deliver the optical input signals at the wavelength $\lambda 1$ to the first optical switch 1010, and the optical input signals at the wavelength $\lambda 2$ to the second optical switch 1020. Similarly, a set of wavelength multiplexers 1041, 1042, 1043 is provided to collect the optical output signals at the wavelengths $\lambda 1$ from the first optical switch 1010, and the optical output signals at the wavelength λ2 from the second optical switch 1020.

The system 1000 is shown for a 3×3 optical switch with 2 wavelengths, however the system could be extended to a greater number of wavelengths. This can be achieved by providing one N×M optical switch per wavelength.

The N×M optical switch can be implemented using different architectures, such as the optical switches described above with reference to FIGS. 2, 3, 4A, 6A, 6B and 7.

The system 1000 allows to separate input signals having different wavelengths and switch them individually. The system adds wavelengths selective switching (every wavelength in the incoming fibre can be routed independently) and simplifies supporting larger wavelengths ranges. In addition the SOA design is simplified, and crosstalk (cross-gain modulation) is reduced.

Figure 11:
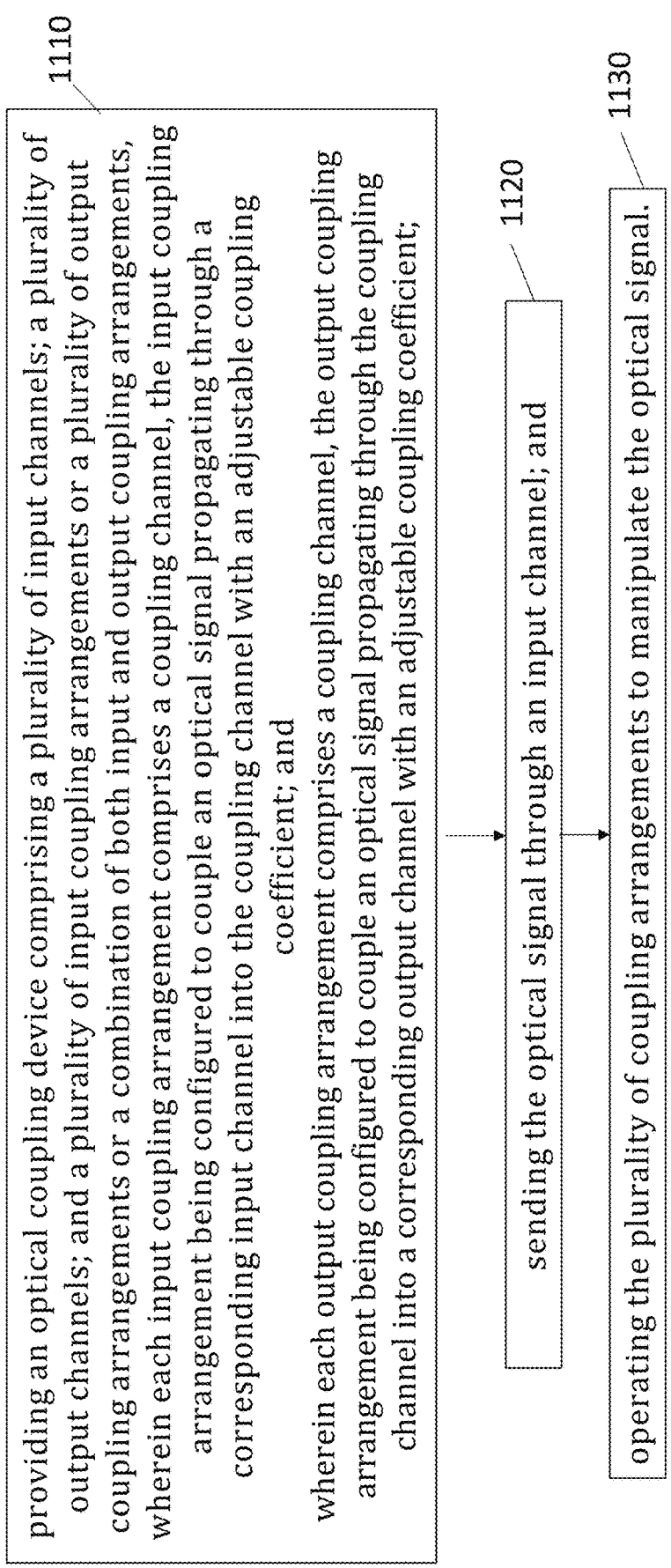
FIG. 11 is a flow chart of a method for manipulating optical signals.

FIG. 11 is a flow chart of a method for manipulating an optical signal. The method includes the steps 1110 to 1130. The optical coupling device as describe with reference to FIGS. 1 to 10 may be implemented using an integrated optical circuit such as a photonic integrated circuit (PIC) or with fibre-based components.

The input channels, coupling channels and output channels may be implemented in a single layer. In this case the input channels and coupling channels may cross at several crossing points. This may lead to some loss of signal and optical crosstalk. For instance, the optical signal might be scattered at the crossing into the other (perpendicular) channel. Alternatively, the input channels may be formed within a first layer, while the coupling channels and output channels are formed within a second layer. The first layer may be provided in a first plane and the second layer may be provided in a second plane substantially parallel to the first plane. For instance the second layer may be provided either above or below the first layer. In this way the channel crossing can be avoided, hence reducing optical losses.

The various channels may be implemented as waveguides such as integrated waveguides. The waveguides may be made of the same or different materials. In a specific example the input waveguides could be implemented in a silicon nitride layer and the coupling waveguides in a silicon layer. The silicon layer may be provided underneath the silicon nitride layer. This approach permits to build a compact device with a fast signal transmission time of the optical signals between input and output ports. For instance, a compact photonic integrated circuit of less than 2×2 cm² may be achieved, hence reducing time of flight to achieve ultra-low latency and recovers signal loss via optical amplifiers.

The optical coupling device can be designed to operate with different wavelengths depending on the application. For instance, the optical coupling device may be designed to operate across the main telecommunication windows around 1200-1600 nm wavelengths.

The optical coupling device of the disclosure may be used for different applications. As explained above the optical coupling device may be used to replicate an input optical signal multiple times and distribute the replicated signals at a plurality of outputs.

The optical coupling device may also be used as a computing device for performing computational tasks, for instance as a multiplication matrix. The modulation of an optical signal can be used to perform a multiplication operation of the optical signal by a predetermined coefficient. In turn the accumulation of modulated signals can be used to perform multiply-accumulate (MAC) operation. Accumulation is carried out by superimposing signals over time. For instance, the amplitude adjusters may be operated to accumulate several optical signals. The size of the matrix can be increased by linking multiple optical coupling devices together.

The optical switches describe with reference to FIGS. 4 to 10 permit to reduce or eliminate the 1/(MN) loss factor by only guiding the light through a path that is required. This results in a lower power consumption as less on-chip gain is needed which in turn allows to build larger switches (higher port counts). Crosstalk between channels is also reduced.

The devices described in FIGS. 2, 3, 4A, 6A, 6B, 7, 9 are bi-directional devices that can be operated in both directions. This means that that an input signal may be sent through the output channels. Stated another way the input and output channels may be swapped so that the output channels become input channels and the input channels become output channels.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. An optical coupling device comprising
a plurality of input channels;
a plurality of output channels;
a plurality of input coupling arrangements and a plurality of output coupling arrangements;
wherein each input coupling arrangement comprises a coupling channel, the input coupling arrangement being configured to couple an optical signal propagating through a corresponding input channel into the coupling channel with an adjustable coupling coefficient;
wherein each output coupling arrangement comprises a coupling channel, the output coupling arrangement being configured to couple an optical signal propagating through the coupling channel into a corresponding output channel with an adjustable coupling coefficient;
wherein each input channel and/or each output channel is provided with an amplitude adjuster comprising an attenuator followed by an optical amplifier; and
wherein the input coupling arrangements and the output coupling arrangements comprise a phase shift element,
wherein the input coupling arrangements and the output coupling arrangements are implemented as interferometers; and
a controller configured to control the operation of the phase shift elements to set the adjustable coupling coefficients, so as to control an amount of optical signal propagating through the input channel, and to control an amount of optical signal propagating through the output channel.

2. The optical coupling device as claimed in claim 1, wherein the phase shift element comprises an optical modulator.

3. The optical coupling device as claimed in claim 1, wherein the interferometer has a first arm and a second arm arranged to form an input combiner-splitter and an output combiner-splitter.

4. The optical coupling device as claimed in claim 1, wherein the coupling channel extends between a first end and a second end.

5. The optical coupling device as claimed in claim 4, wherein each input channel extends along a corresponding longitudinal axis, and wherein the input channels are arranged substantially parallel to each other; and wherein the coupling channels are substantially perpendicular to the input channels.

6. The optical coupling device as claimed in claim 4, wherein the coupling channel forms part of an input coupling arrangement at the first end, and wherein the coupling channel forms part of an output coupling arrangement at the second end.

7. The optical coupling device as claimed in claim 1, wherein each optical amplifier is a semiconductor optical amplifier.

8. The optical coupling device as claimed in claim 1, wherein each attenuator is one of a Mach Zehnder modulator, an electro-absorption modulator, a micro-ring resonator, and a phase-change material modulator.

9. The optical coupling device as claimed in claim 1, wherein the plurality of coupling channels forms at least one primary set of coupling channels configured to couple the plurality of input channels to a single output channel; and wherein the plurality of coupling channels forms at least one secondary set of coupling channels configured to couple a single input channel to a plurality of output channels.

10. The optical coupling device as claimed in claim 1, wherein each input channel is provided with an edge coupler for coupling the input channel to an optical fiber; and wherein each output channel is provided with an edge coupler for coupling the output channel to an optical fiber.

11. The optical coupling device as claimed in claim 1, wherein the optical coupling device is bi-directional.

12. A system comprising a plurality of optical coupling devices as claimed in claim 1, wherein each optical coupling device is configured to receive optical input signals at a specific wavelength.

13. The system as claimed in claim 12, comprising a plurality of wavelength demultiplexers coupled to input ports of the plurality of optical coupling devices and a plurality of wavelength multiplexers coupled to output ports of the plurality of optical coupling devices.

14. An integrated optical chip comprising an optical coupling device as claimed in claim 1.

15. An optical coupling device for performing signal replication, comprising
a plurality of input channels;
a plurality of output channels;
a plurality of input coupling arrangements and a plurality of output coupling arrangements;
wherein each input coupling arrangement comprises a coupling channel, the input coupling arrangement being configured to couple an optical signal propagating through a corresponding input channel into the coupling channel with an adjustable coupling coefficient;
wherein each output coupling arrangement comprises a coupling channel, the output coupling arrangement being configured to couple an optical signal propagating through the coupling channel into a corresponding output channel with an adjustable coupling coefficient;
wherein each coupling channel, and/or each input channel, and/or each output channel, is provided with an amplitude adjuster comprising an attenuator followed by an optical amplifier;
wherein the input coupling arrangements and/or the output coupling arrangements comprise a phase shift element,
wherein the input coupling arrangements and/or the output coupling arrangements are implemented as interferometers; and
a controller configured to control the operation of the phase shift elements to set the adjustable coupling coefficients, so as to control an amount of optical signal propagating through the input channel when the phase shift element is part of an input coupling arrangement, and to control an amount of optical signal propagating through the output channel when the phase shift element is part of an output coupling arrangement,
wherein the controller is further configured to perform signal replication by
setting the adjustable coupling coefficients of the input coupling arrangements to couple an optical signal from a single input port to a plurality of coupling channels and to prevent coupling from other optical signals to other coupling channels; and
by turning on one or more optical amplifiers connected to the single input port, to address multiple output ports so that for each replicated signal an amplitude of the replicated signal is compensated for optical losses.

16. A method of manipulating an optical signal, the method comprising
providing an optical coupling device comprising a plurality of input channels; a plurality of output channels; and at least one of a plurality of input coupling arrangements and a plurality of output coupling arrangements;
wherein each input coupling arrangement comprises a coupling channel, the input coupling arrangement being configured to couple an optical signal propagating through a corresponding input channel into the coupling channel with an adjustable coupling coefficient; and
wherein each output coupling arrangement comprises a coupling channel, the output coupling arrangement being configured to couple an optical signal propagating through the coupling channel into a corresponding output channel with an adjustable coupling coefficient;
wherein each input channel, and/or each output channel is provided with an amplitude adjuster comprising an attenuator followed by an optical amplifier;
wherein the input coupling arrangements and/or the output coupling arrangements comprise a phase shift element;
wherein the input coupling arrangements and the output coupling arrangements are implemented as interferometers;
sending the optical signal through an input channel; and
operating the plurality of coupling arrangements with a controller to manipulate the optical signal; wherein the controller is configured to control the operation of the phase shift elements to set the adjustable coupling coefficients so as to control an amount of optical signal propagating through the input channel and to control an amount of optical signal propagating through the output channel.

* * * * *